United States Patent
Gupta et al.

(10) Patent No.: US 10,732,884 B1
(45) Date of Patent: Aug. 4, 2020

(54) IMPLEMENTING REDUNDANT ARRAY OF INDEPENDENT DISKS (RAID) ARRAYS HAVING COMPRESSED DATA STORED THEREIN

(71) Applicant: International Business Machines Corporation, Armonk, NY (US)

(72) Inventors: Lokesh M. Gupta, Tucson, AZ (US); Clint A. Hardy, Tucson, AZ (US); Karl A. Nielsen, Tucson, AZ (US); Brian A. Rinaldi, Tucson, AZ (US); Matthew G. Borlick, Tucson, AZ (US); Matthew J. Kalos, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/368,520

(22) Filed: Mar. 28, 2019

(51) Int. Cl.
*G06F 12/00* (2006.01)
*G06F 3/06* (2006.01)

(52) U.S. Cl.
CPC .......... *G06F 3/0647* (2013.01); *G06F 3/0604* (2013.01); *G06F 3/067* (2013.01); *G06F 3/0689* (2013.01)

(58) Field of Classification Search
CPC ...... G06F 3/0647; G06F 3/0604; G06F 3/067; G06F 3/0689
See application file for complete search history.

(56) References Cited

U.S. PATENT DOCUMENTS

| | | | |
|---|---|---|---|
| 6,449,689 B1 | 9/2002 | Corcoran et al. | |
| 8,073,047 B2 | 12/2011 | Fallon et al. | |
| 9,335,932 B2 | 5/2016 | Lango et al. | |
| 9,569,357 B1 | 2/2017 | Shalev et al. | |
| 9,886,345 B2 | 2/2018 | Kahler et al. | |
| 2006/0190643 A1 | 8/2006 | Kedem et al. | |
| 2017/0160948 A1 | 6/2017 | Rueger et al. | |

OTHER PUBLICATIONS

Battles et al., "Reducing Data Center Power Consumption Through Efficient Storage," Network Appliance, Inc., Feb. 2007, pp. 1-9.

*Primary Examiner* — Gurtej Bansal
(74) *Attorney, Agent, or Firm* — Zilka-Kotab, P.C.

(57) ABSTRACT

A computer-implemented method for implementing a RAID array, according to one approach, includes: predicting a compression ratio of data to be stored in the RAID array, and using the predicted compression ratio and a physical storage capacity of the RAID array to calculate a maximum virtual storage capacity of the RAID array. The maximum virtual storage capacity is used to establish an effective storage capacity of the RAID array. One or more instructions to store compressed data in the RAID array are also sent. In response to occurrence of a predetermined event, a current compression ratio of the compressed data stored in the RAID array and the physical storage capacity of the RAID array are used to calculate a current virtual storage capacity of the RAID array. Furthermore, the effective storage capacity of the RAID array is scaled based on the current virtual storage capacity.

25 Claims, 8 Drawing Sheets

IMPLEMENTING REDUNDANT ARRAY OF INDEPENDENT DISKS (RAID) ARRAYS HAVING COMPRESSED DATA STORED THEREIN

BACKGROUND

The present invention relates to data storage systems, and more specifically, this invention relates to implementing RAID arrays which support data compression.

RAID involves a data storage virtualization technology which combines multiple physical data storage (e.g., memory) components into one or more logical units. Storing data in these logical units involves actually distributing or "striping" the data across the different physical data storage components. In doing so, the one or more logical units are able to improve data redundancy and/or overall performance in comparison to traditional data storage schemes.

Data is distributed across the different physical data storage components in a RAID array using one of several schemes, which are also referred to as "RAID levels". Each of the RAID levels are typically referred to using the word "RAID" followed by a number, such as RAID 0 or RAID 1. Each scheme, or RAID level, provides a different data distribution layout which balances reliability, availability, performance, and capacity in different manners. For example, RAID levels greater than RAID 0 provide protection against unrecoverable sector read errors, as well as against failures of whole physical drives.

While RAID arrays provide a number of improvements to data storage, they have previously been unable to effectively support compressed data. The compressibility of data varies greatly depending on a number of factors, including the type of data itself. Each of the storage drives included in a RAID array, and even the different storage components included therein (e.g., the different disks in a hard disk drive), may also have a significant effect on the compressibility of the data stored thereon. Thus, the actual amount of compressed data that can be stored in memory will vary significantly.

The overall capacity of the RAID array is also directly affected by these differences in achievable data compression, thereby subjecting the RAID array to data overflow situations. While these variations are relatively straightforward to address in standard data storage schemes by simply adding additional storage components to accommodate any excess data, it is significantly more difficult to do so in the context of RAID arrays. As a result, conventional RAID arrays have been unable to support compressed data.

SUMMARY

A computer-implemented method for implementing a RAID array, according to one approach, includes: predicting a compression ratio of data to be stored in the RAID array, and using the predicted compression ratio and a physical storage capacity of the RAID array to calculate a maximum virtual storage capacity of the RAID array. The maximum virtual storage capacity is used to establish an effective storage capacity of the RAID array. One or more instructions to store compressed data in the RAID array are also sent. In response to occurrence of a predetermined event, a current compression ratio of the compressed data stored in the RAID array and the physical storage capacity of the RAID array are used to calculate a current virtual storage capacity of the RAID array. Furthermore, the effective storage capacity of the RAID array is scaled based on the current virtual storage capacity.

As a result, this approach is able to actively monitor data compression ratios at the individual storage device level and adjust a virtual capacity of the overarching RAID array based on the device level compression performance. This desirably allows for various ones of the approaches included herein to effectively and efficiently implement RAID arrays which support data compression.

In some approaches, the current compression ratio of the compressed data stored in the RAID array and the physical storage capacity of the RAID array are used to calculate a current virtual storage capacity of the RAID array in response to detecting a predetermined change in the current compression ratio of the compressed data stored in the RAID array. In other words, the virtual storage capacity of the RAID array is updated periodically during actual use based on changes that occur to the compression ratio of the compressed data stored in the RAID array, thereby improving operational efficiency of the computer-implemented method.

Further still, in some approaches a percentage of the physical storage capacity of the RAID array is overprovisioned. In other words, a predetermined amount of the physical storage capacity of the RAID array is designated as being unavailable, and is therefore not considered in the process of establishing the effective storage capacity. Implementing overprovisioning in such approaches is able to achieve even further improvements to performance. For example, overprovisioning implemented in SSDs is able to increase endurance by distributing the total number of write and/or erase operations across a larger number of blocks and/or pages over time. SSD overprovisioning is also able to improve performance by providing additional buffer space for managing program/erase (P/E) cycles.

A computer program product for implementing a RAID array, according to another approach, includes a computer readable storage medium having program instructions embodied therewith. The program instructions are readable and/or executable by a processor to cause the processor to: perform the foregoing method.

A system, according to yet another approach, includes: a processor, and logic integrated with the processor, executable by the processor, or integrated with and executable by the processor. The logic is configured to: perform the foregoing method, in addition to overprovisioning a percentage of the physical storage capacity of the RAID array. As mentioned above, implementing overprovisioning in such approaches is able to achieve significant improvements to performance. For example, overprovisioning implemented in SSDs is able to increase endurance by distributing the total number of write and/or erase operations across a larger number of blocks and/or pages over time. SSD overprovisioning is also able to improve performance by providing additional buffer space for managing program/erase (P/E) cycles.

Other aspects and embodiments of the present invention will become apparent from the following detailed description, which, when taken in conjunction with the drawings, illustrate by way of example the principles of the invention.

DETAILED DESCRIPTION

Figure 1:
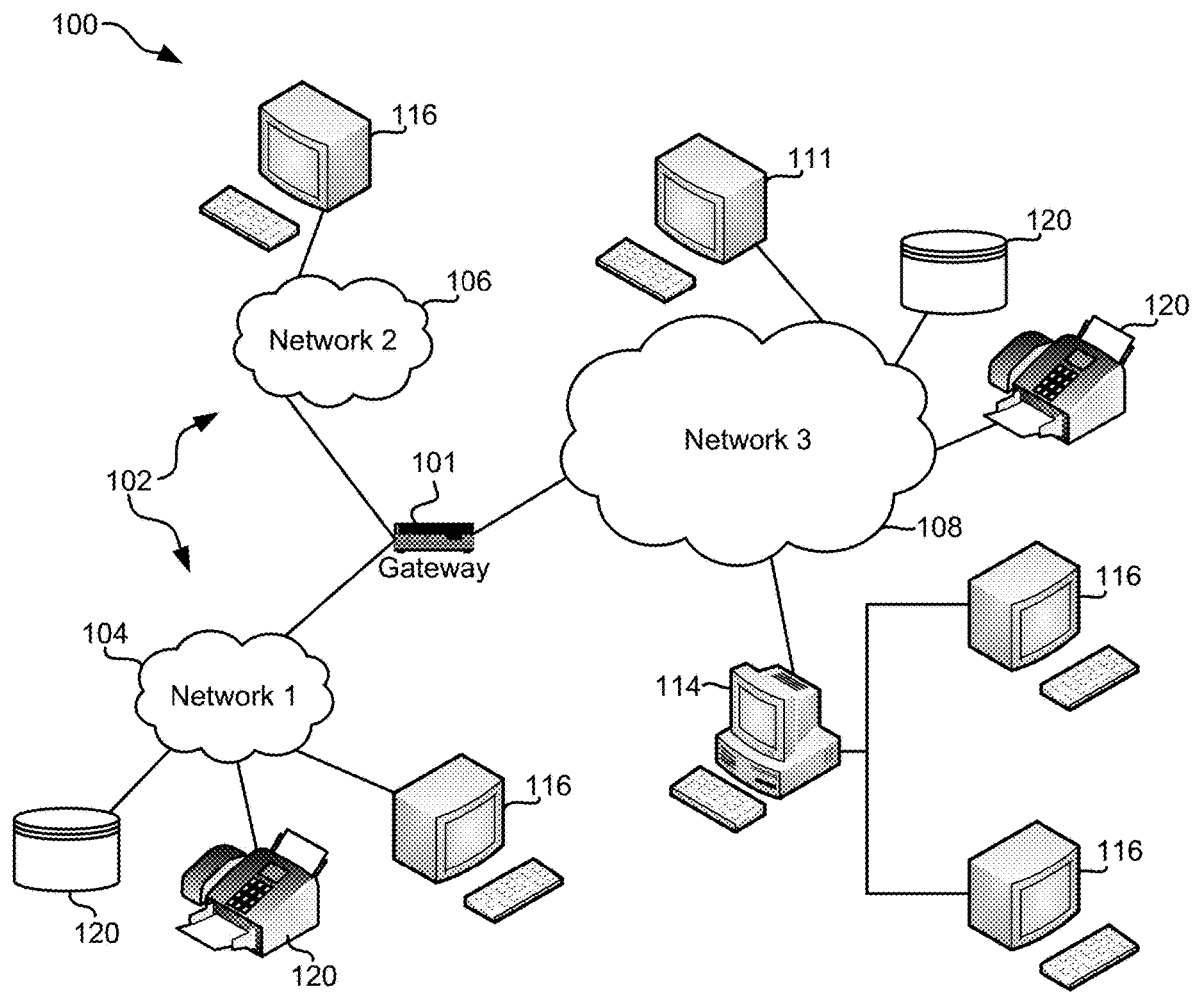
FIG. 1 is a network architecture, in accordance with one approach.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred approaches of systems, methods and computer program products for effectively and efficiently implement RAID arrays which support data compression. Thus, some of the approaches included herein are capable of storing compressed data in RAID arrays without experiencing performance delays and/or data losses caused by storage capacity issues, e.g., as will be described in further detail below.

In one general approach, a computer-implemented method for implementing a RAID array, includes: predicting a compression ratio of data to be stored in the RAID array, and using the predicted compression ratio and a physical storage capacity of the RAID array to calculate a maximum virtual storage capacity of the RAID array. The maximum virtual storage capacity is used to establish an effective storage capacity of the RAID array. One or more instructions to store compressed data in the RAID array are also sent. In response to occurrence of a predetermined event, a current compression ratio of the compressed data stored in the RAID array and the physical storage capacity of the RAID array are used to calculate a current virtual storage capacity of the RAID array. Furthermore, the effective storage capacity of the RAID array is scaled based on the current virtual storage capacity.

In another general approach, a computer program product for implementing a RAID array, includes a computer readable storage medium having program instructions embodied therewith. The program instructions are readable and/or executable by a processor to cause the processor to: perform the foregoing method.

In still another general approach, a system includes: a processor, and logic integrated with the processor, executable by the processor, or integrated with and executable by the processor. The logic is configured to: predict, by the processor, a compression ratio of data to be stored in the RAID array; and use, by the processor, the predicted compression ratio and a physical storage capacity of the RAID array to calculate a maximum virtual storage capacity of the RAID array. A percentage of the physical storage capacity of the RAID array is overprovisioned by the processor, and an effective storage capacity of the RAID array is established, by the processor, using the maximum virtual storage capacity. One or more instructions to store compressed data in the RAID array are also sent by the processor. In response to occurrence of a predetermined event, a current compression ratio of the compressed data stored in the RAID array and the physical storage capacity of the RAID array are used, by the processor, to calculate a current virtual storage capacity of the RAID array. Furthermore, the effective storage capacity of the RAID array is scaled, by the processor, based on the current virtual storage capacity.

FIG. 1 illustrates an architecture 100, in accordance with one approach. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one approach.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some approaches.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
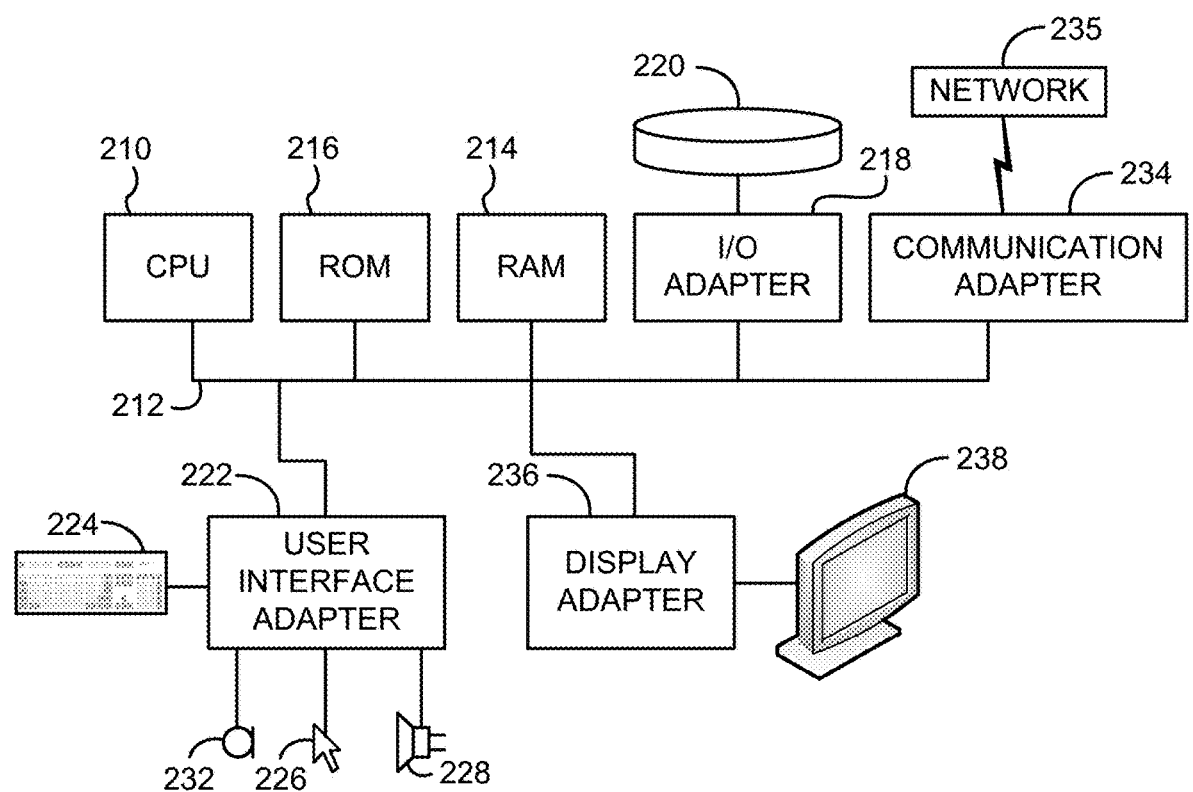
FIG. 2 is a representative hardware environment that may be associated with the servers and/or clients of FIG. 1, in accordance with one approach.

FIG. 2 shows a representative hardware environment associated with a user device 116 and/or server 114 of FIG. 1, in accordance with one approach. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred approach may also be implemented on platforms and operating systems other than those mentioned. A preferred approach may be written using eXtensible Markup Language (XML), C, and/or C++ language, or other programming languages, along with an object oriented programming methodology. Object oriented programming (OOP), which has become increasingly used to develop complex applications, may be used.

Figure 3:
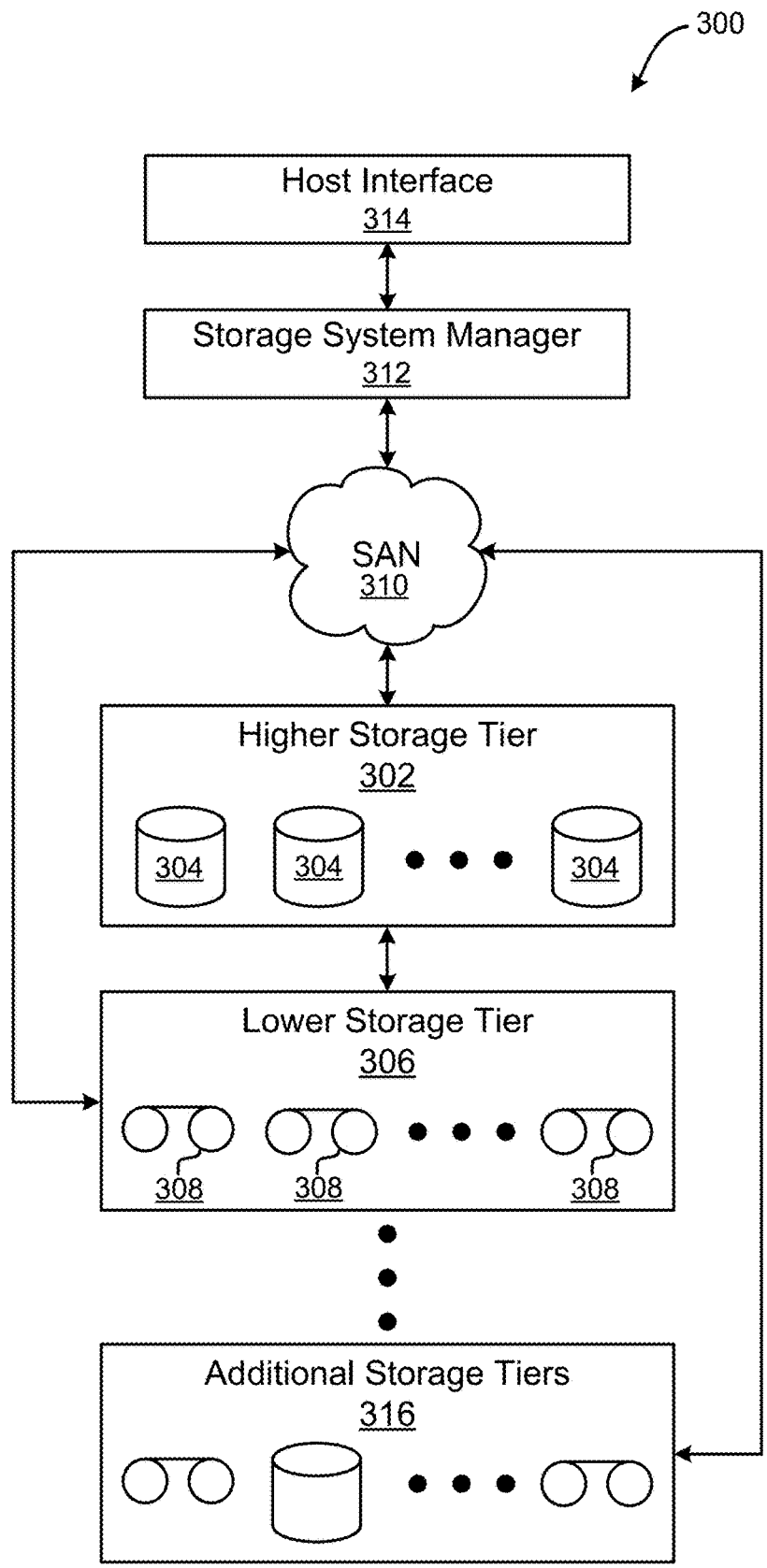
FIG. 3 is a tiered data storage system in accordance with one approach.

Now referring to FIG. 3, a storage system 300 is shown according to one approach. Note that some of the elements shown in FIG. 3 may be implemented as hardware and/or software, according to various approaches. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more approaches, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the approaches presented herein.

According to some approaches, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various approaches.

As previously mentioned, while RAID arrays provide a number of improvements to data storage, they have been unable to effectively support compressed data. Again, the compressibility of data varies greatly depending on a number of factors, including the type of data itself. Each of the storage drives included in a RAID array, and even the different storage components included therein (e.g., the different disks in a hard disk drive), may also have a significant effect on the compressibility of the data stored thereon. Thus, the actual amount of compressed data that can be stored in a given portion of memory will vary significantly.

The overall capacity of the RAID array is also directly affected by these differences in achievable data compression, thereby subjecting the RAID array to data overflow situations. This is particularly problematic in situations where compressed data already stored in the RAID array is amended and rewritten using a different compression ratio. Again, conventional RAID arrays have thereby been unable to support compressed data.

In sharp contrast to the foregoing issues experienced by conventional products, various ones of the approaches included herein are able to effectively and efficiently implement RAID arrays which support data compression. Thus, some of the approaches included herein are capable of storing compressed data in RAID arrays without experiencing performance delays and/or data losses caused by storage capacity issues, e.g., as will be described in further detail below.

Again, RAID arrays typically include a number of (e.g., more than one) different physical storage devices which are organized into a logical array. Data is thereby striped and/or mirrored across the different physical storage devices in the logical array using different schemes. Each of these schemes provide different benefits with respect to the storage of data in the given RAID array. For example, data stored in a RAID-0 configuration is striped across the storage devices, but data mirroring and parity data are not implemented. Applying this scheme thereby improves data processing speeds by utilizing the various storage devices, but does not address data retention. According to another example, a RAID-1 configuration implements data mirroring which improves data access speeds by utilizing more than one storage device while also providing some data retention, but introduces some write latency in order to maintain the data mirroring.

In still other examples, some RAID configurations (e.g., RAID-5, RAID-6, etc.) involve striping data across all storage devices in the array, in addition to reserving one or more units of each data stripe to store parity data which corresponds to the other data in the stripe. The parity data is thereby distributed and/or rotated throughout the array. It follows that a given update operation (e.g., a new write operation, modify operation, etc.) has an equal chance of being performed at any of the storage devices in the array. However, any such update operation also results in an update being performed at the storage device having the corresponding parity data.

Figure 4:
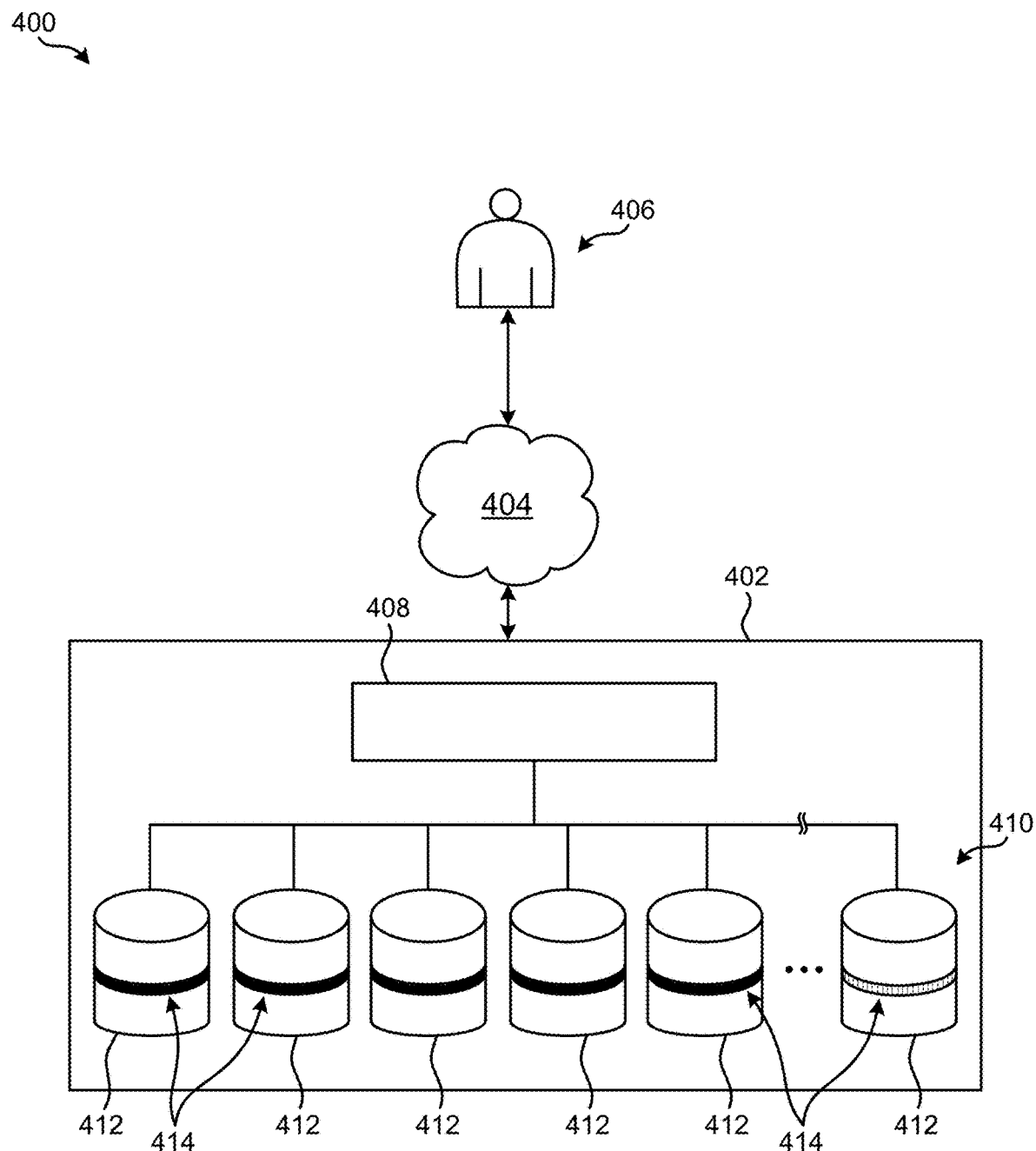
FIG. 4 is a partial representational view of a data storage system in accordance with one approach.

FIG. 4 depicts a data storage system 400 having a RAID configuration implemented therein, in accordance with one approach. As an option, the present data storage system 400 may be implemented in conjunction with features from any other approach listed herein, such as those described with reference to the other FIGS., such as FIGS. 1-3. However, such data storage system 400 and others presented herein may be used in various applications and/or in permutations which may or may not be specifically described in the illustrative approaches listed herein. Further, the data storage system 400 presented herein may be used in any desired environment. Thus FIG. 4 (and the other FIGS.) may be deemed to include any possible permutation.

As shown, the data storage system 400 actually includes a storage location 402 which is connected to a network 404. A user 406 is also connected to the network 404 in the present approach, thereby allowing for the user 406 to communicate with (e.g., send read requests to, receive data from, write data to, etc.) the storage location 402.

The network 404 may be of any type, e.g., depending on the desired approach. For instance, in some approaches the network 404 is a WAN, e.g., such as the Internet. However, an illustrative list of other network types which network 404 may implement includes, but is not limited to, a LAN, a PSTN, a SAN, an internal telephone network, etc. Accordingly, the on-premise storage location 402 is able to communicate with the remote user 406 and/or any other entities which may be connected to the network 404 regardless of the amount of separation which exists therebetween, e.g., despite being positioned at different geographical locations.

The storage location 402 further includes a controller 408 which is coupled to a number of different physical storage devices 412. In some approaches, each of the physical storage devices 412 include the same type of memory. For example, each of the physical storage devices 412 are HDDs in some approaches. However, in other approaches the physical storage devices 412 include more than one different type of memory, e.g., such as HDDs, SSDs, magnetic tape, etc. Each of the physical storage devices 412 may also be able to compress data prior to it being stored in the respective physical storage devices 412. In other words, each of the physical storage devices 412 (e.g., HDDs) are able to perform drive level data compression and/or decompression in some approaches.

Referring still to FIG. 4, the physical storage devices 412 are organized as a logical array 410. In other words, the physical storage devices 412 are collectively interpreted by the controller 408 as being a single logical volume of memory in some approaches. Accordingly, data which is stored in the same logical array 410 may actually be stored on different physical storage devices 412. For instance, an exemplary RAID stripe 414 is shown as extending across all storage devices 412 in the logical array 410. In other words, the logical array 410 serves as a RAID array which spans across more than one of the physical storage devices 412. As mentioned above, the specific RAID configuration implemented also determines how information is actually organized in the RAID stripe 414. For instance, the portion of the RAID stripe 414 located at the right-most storage device 412 (denoted by the crosshatching) is reserved for storing parity data which corresponds to the remainder of the data stored in the RAID stripe 414 in some approaches.

Once again, it is noted that while RAID arrays provide a number of improvements to data storage, conventional RAID implementations have been unable to effectively support compressed data. Compressibility of data varies greatly depending on a number of factors, including the type of data itself, the storage drives included in a RAID array, and even the different storage components included therein. Thus, the actual amount of compressed data that can be stored in a given RAID stripe, or a storage device itself will vary significantly. The overall capacity of the RAID array is also directly affected by these differences in achievable data compression, thereby subjecting the RAID array to data overflow situations. This is particularly problematic in situations where compressed data already stored in a RAID array is amended and rewritten using a different compression ratio than the compression ratio implemented when previously writing the compressed data.

In sharp contrast to the foregoing issues experienced by conventional implementations, various ones of the approaches included herein are able to effectively and efficiently implement RAID arrays which support data compression. Thus, some of the approaches included herein are capable of storing compressed data in RAID arrays without experiencing performance delays and/or data losses caused by storage capacity issues. For instance, looking now to FIG. 5A, a flowchart of a method 500 for implementing a RAID array, is shown according to one approach. The method 500 may be performed in accordance with the present invention in any of the environments depicted in FIGS. 1-4, among others, in various approaches. Of course, more or less operations than those specifically described in FIG. 5A may be included in method 500, as would be understood by one of skill in the art upon reading the present descriptions.

Each of the steps of the method 500 may be performed by any suitable component of the operating environment. For example, in various approaches, the method 500 may be partially or entirely performed by a controller, a processor, a computer, etc., or some other device having one or more processors therein. Thus, in some approaches, method 500 may be a computer-implemented method. Moreover, the terms computer, processor and controller may be used interchangeably with regards to any of the approaches herein, such components being considered equivalents in the many various permutations of the present invention.

Moreover, for those approaches having a processor, the processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

Figure 5A:
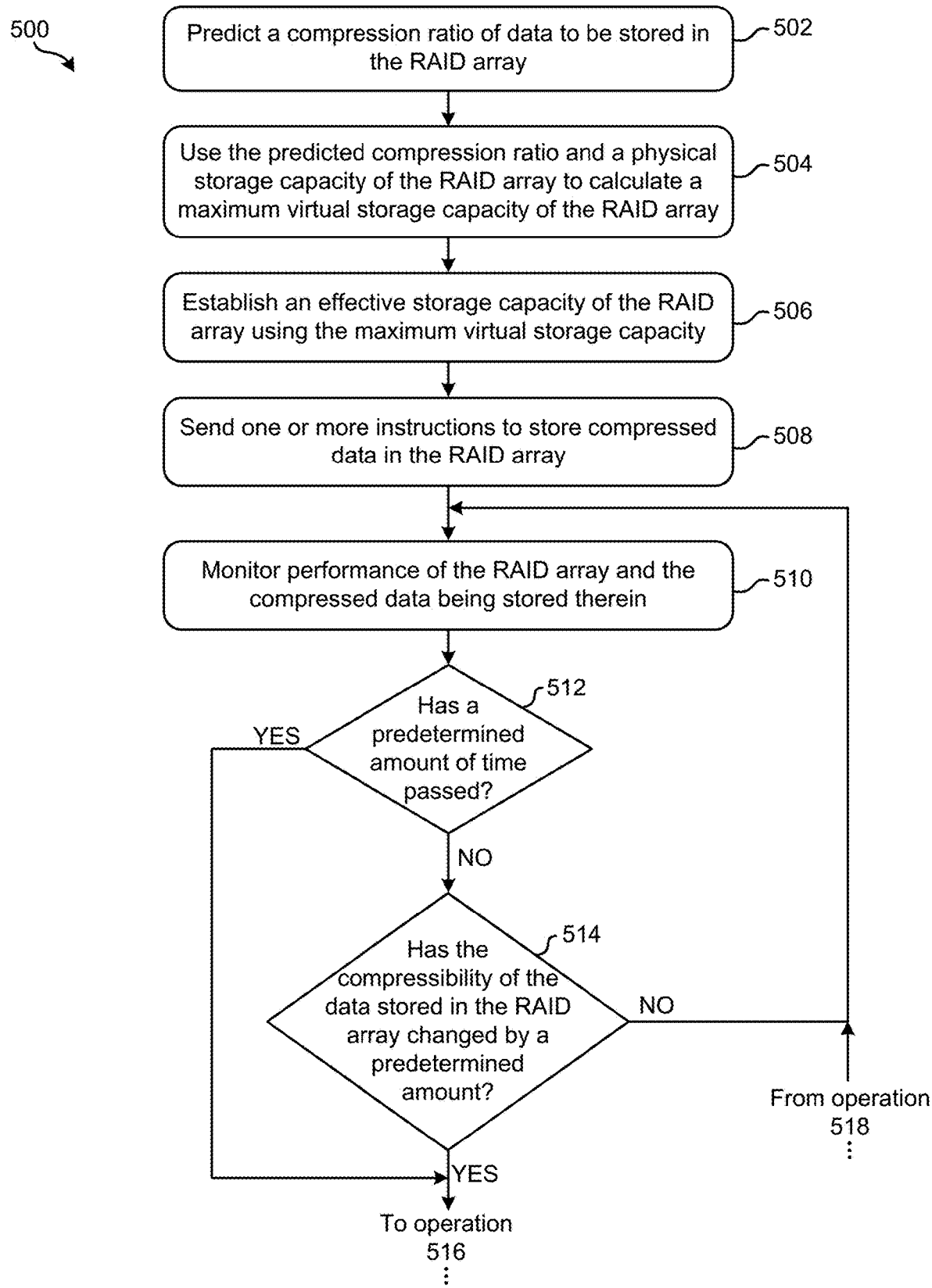
FIG. 5A is a flowchart of a method in accordance with one approach.
Figure 5A:
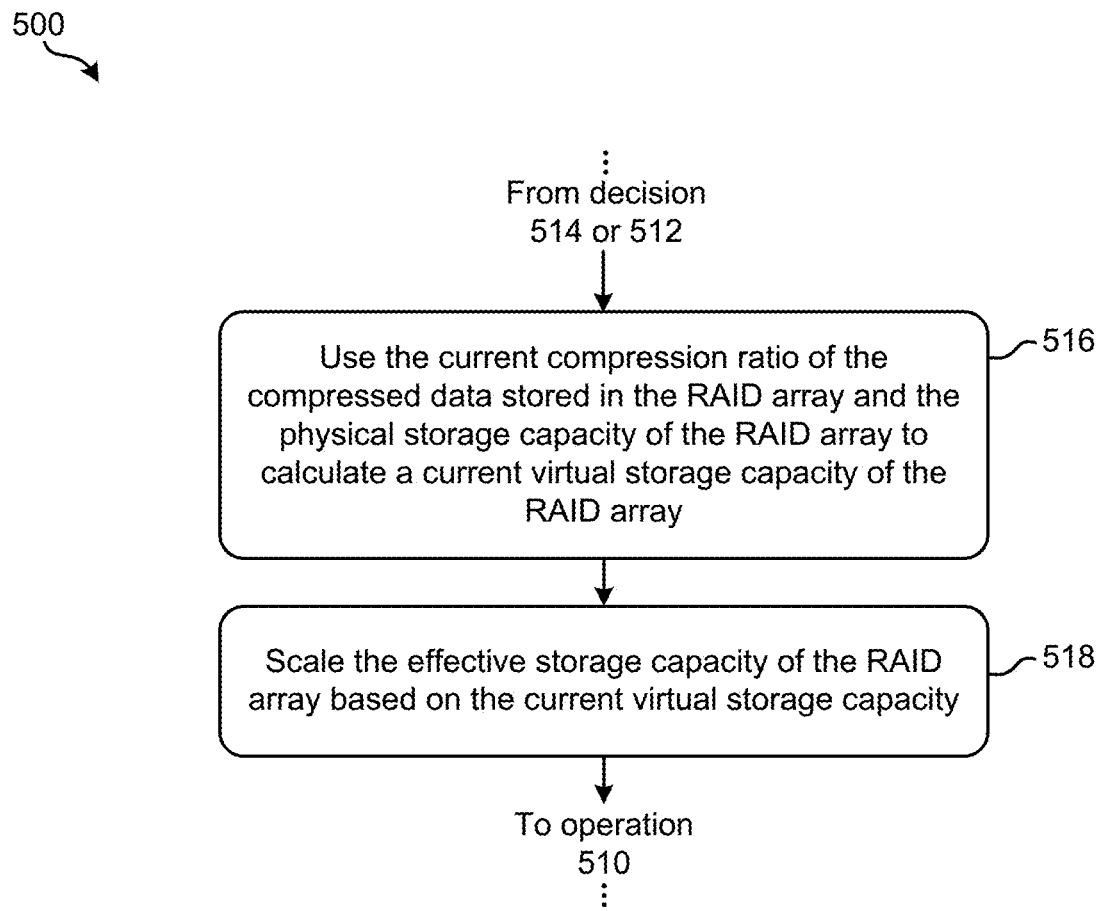

As shown in FIG. 5A, operation 502 of method 500 includes predicting a compression ratio of data to be stored in the RAID array. In other words, operation 502 includes predicting an amount of compression that future data, which is not yet stored in the RAID array, will be able to achieve. According to an illustrative example, which is in no way intended to limit the invention, a compression ratio of 4:1 is predicted (e.g., assumed) for the data which will be stored in the RAID array.

The process of predicting a compression ratio of data which has not yet been received may be performed differently and/or based on different types of available information, e.g., depending on the desired approach. For instance, in some approaches the compression ratio is predicted based on the type of storage environment that the RAID array is implemented in and/or the type of data associated with the storage environment. In other approaches, predicting the compression ratio is based on data compression ratios previously achieved by the same or other RAID arrays. In some approaches, predicting the compression ratio involves examining the compression ratios achieved by each of the different storage drives (e.g., HDDs) in the RAID array and/or the different storage components included in each of the storage drives (e.g., the different disks in a HDD), and identifying a lowest compression ratio. While this lowest compression ratio translates to a lower overall storage capacity for the RAID array, it also represents the highest compression ratio that all storage drives and storage components included in the RAID array are able to successfully implement and maintain, e.g., as would be appreciated by one skilled in the art after reading the present description.

In still other approaches, the compression ratio is predicted based on a first portion of data received by the RAID array, e.g., such as a data sample. In some approaches, the process of predicting the compression ratio actually involves using a default compression ratio while also providing the opportunity for adjustments to be made thereto, e.g., by a user. The default compression ratio may be predetermined based on industry standards, historical use data, user preferences, storage capacity standards, etc. Moreover, adjustments may be made to the default compression ratio based on any of the foregoing information.

With continued reference to FIG. 5A, operation 504 includes using the predicted compression ratio and a physical storage capacity of the RAID array to calculate a maximum virtual storage capacity of the RAID array. In preferred approaches, the maximum virtual storage capacity of the RAID array is calculated by multiplying the compression ration predicted in operation 502 with the physical storage capacity of the RAID array. According to another example, which again is in no way intended to limit the invention, a RAID array having a physical storage capacity of 100 Gigabytes (GB) and a predicted compression ratio of 4:1 would be calculated as having a maximum virtual storage capacity of 400 GB. In other words, because the data is predicted to compress to one quarter its original size, the RAID array is effectively able to store four times as much data, e.g., assuming the predicted compression ratio is accurate.

Operation 506 further includes establishing an effective storage capacity of the RAID array using the maximum virtual storage capacity. The effective storage capacity essentially represents a working capacity for the RAID array which incorporates the anticipated compressibility of the data that will be stored therein. Revisiting the example presented above, a RAID array having a physical storage capacity of 100 GB and a predicted compression ratio of 4:1 would have a maximum virtual storage capacity of 400 GB. Accordingly, the effective storage capacity of the RAID array may be set to 400 GB despite the array having a physical storage capacity of 100 GB. Again, because the data is predicted to compress to one quarter its original size, the RAID array is effectively able to store four times as much data, e.g., assuming the predicted compression ratio is accurate.

With respect to the present description, establishing the effective storage capacity preferably ensures that the RAID array does not experience data overflows. The process of actually establishing the effective storage capacity may simply involve logically allocating the effective storage capacity to relevant applications in some approaches. For example, using thin-provisioned storage architectures allows for the physical storage capacity to be over-committed based on the effective storage capacity. In other approaches, the effective storage capacity is established by applying it to a storage controller which manages the RAID array. For instance, the effective storage capacity may be used by a memory-management unit that is in and/or coupled to the storage controller in order to set storage limits as well as properly correlate logical and physical memory addresses, e.g., as would be appreciated by one skilled in the art after reading the present description.

In still other approaches, the effective storage capacity of the RAID array incorporates overprovisioning. Accordingly, in some approaches operation 506 includes an optional sub-operation of overprovisioning a predetermined percentage of the physical storage capacity of the RAID array. In other words, a predetermined amount of the physical storage capacity of the RAID array is designated as being unavailable, and is therefore not considered in the process of establishing the effective storage capacity. The manner in which overprovisioning is implemented also varies depending on the specific type(s) of memory the RAID array is implemented in. For example, overprovisioning implemented in SSDs is able to increase endurance by distributing the total number of write and/or erase operations across a larger number of blocks and/or pages over time. SSD overprovisioning is also able to improve performance by providing additional buffer space for managing program/erase (P/E) cycles. The actual amount of the physical storage capacity of the RAID array which is overprovisioned may be predetermined by a user, set according to industry standards, based on previous use, etc.

With continued reference to FIG. 5A, operation 508 includes sending one or more instructions to store compressed data in the RAID array. As mentioned above, one or more of the steps included in method 500 may be performed by any suitable component of the operating environment. Thus, various ones of the processes included in FIG. 5A may be performed by a processor (e.g., controller) which is actually included at the storage location where the RAID array exists, directly coupled to the storage location where the RAID array exists, in communication with the storage location where the RAID array exists (e.g., using a network connection), etc. It follows that the one or more instructions send in operation 508 may be sent using different communication channels and/or to different locations depending on the desired approach. According to an exemplary approach, which is in no way intended to limit the invention, the one or more instructions to store compressed data in the RAID array are sent to a storage controller which manages the RAID array and the data stored therein.

The process of storing compressed data in the RAID array may be accomplished differently depending on the approach. For instance, in some approaches data received at a storage location may already be compressed, in which case the compressed data may simply be evaluated (e.g., to determine the compressibility of the data) and stored in the RAID array. In other approaches, data is compressed after being received at a storage location. For example, drive level compression is implemented in some approaches to compress data prior to the data being stored in the RAID array. Data retrieved from the RAID array (e.g., read from) may also be decompressed using drive level compression components prior to further use thereof. Drive level compression may actually be achieved in some approaches by an on-the-fly drive compression utility. Moreover, the drive compression utility may operate automatically in the background, thereby avoiding any interference with data storage operations.

Operation 510 includes continuing to monitor performance of the RAID array and the compressed data being stored therein. However, the scope and/or type of information which is monitored in operation 510 may vary depending on the given approach. For instance, in some approaches the virtual storage capacity of the RAID array is updated periodically over time, e.g., in order to account for changes in the compression ratio of data being stored in the array. According to a specific example, the virtual storage capacity of the RAID array is updated every hour. It follows that operation 510 may include monitoring an amount of time that has passed since a previous data compression prediction was made. In other approaches, an unused amount of the effective storage capacity is monitored in order to maintain an accurate account of how full the RAID array is.

In still other approaches, operation 510 may include monitoring the current compression ratio of the compressed data stored in the RAID array. The current compression ratio provides an accurate representation of the compression ration which is actually achieved in practice. Moreover, the current compression ratio may be compared to the previously predicted compression ratio in order to gage how accurately the prediction represents the status of the data currently being stored in the RAID array. Adjustments may thereby be made to the effective storage capacity of the RAID array in order to compensate for any discrepancies between the predicted data compression ratio and the current compression ratio, e.g., as will soon become apparent.

Proceeding to decision 512, a determination is made as to whether a predetermined amount of time has passed since the effective storage capacity of the RAID array was last established and/or updated. As mentioned above, the virtual storage capacity of the RAID array is updated periodically over time in some approaches, e.g., in order to account for changes in the compression ratio of data being stored in the array. The amount of time which separates each recurring update to the virtual storage capacity (e.g., the temporal period) may be predetermined by a user, set equal to a default value, predetermined according to the type of memory, a size of the RAID array, the type or RAID scheme implemented, etc.

In response to determining that the predetermined amount of time has passed since the effective storage capacity of the RAID array was last established and/or updated, method 500 proceeds directly to operation 516. There, operation 516 includes using the current compression ratio of the compressed data stored in the RAID array and the physical storage capacity of the RAID array to calculate a current virtual storage capacity of the RAID array. In other words, the virtual storage capacity of the RAID array is updated periodically during actual use based on changes that occur to the compression ratio of the compressed data stored in the RAID array. The current virtual storage capacity of the RAID array is preferably calculated by multiplying the current compression ratio of the compressed data stored in the RAID array with the physical storage capacity of the RAID array, e.g., according to any of the approaches described above. Moreover, the current compression ratio is determined in some approaches by computing an average data compression ratio for all data currently stored in the RAID array. In other approaches, the current compression ratio may be set equal to a ratio which reflects the compressibility of a portion of data which was most recently stored in the RAID array, a lowest experienced compression ratio, a highest experienced compression ratio, etc.

According to an example, which is in no way intended to limit the invention, a RAID array having a physical storage capacity of 200 GB and an originally predicted compression ratio of 4:1 would be calculated as having an initial maximum virtual storage capacity of 800 GB. In other words, because the data is predicted to compress to one quarter its original size, the RAID array is effectively able to store four times as much data. Over time however, the compression ratio of the data being stored in the RAID array may reduce such that the compression of the data stored in the RAID array is 3:1 when sampled some time after the initial compression ratio was predicted. It follows that the maximum virtual storage capacity of the RAID array has fallen from 800 GB to 600 GB, having a similar effect on the effective storage capacity of the RAID array. Failing to account for this significant reduction to the effective storage capacity would likely lead to an undesirable data overflow event experienced by the RAID array.

However, it should also be noted that the virtual storage capacity of the RAID array may be updated in response to the occurrence of one or more predetermined events other than the passage of a predetermined amount of time. Returning to decision 512, method 500 proceeds to decision 514 in response to determining that a predetermined amount of time has not passed since the effective storage capacity of the RAID array was established. There, decision 514 includes determining whether the compressibility of the data stored in the RAID array has changed by a predetermined amount. In other words, decision 514 includes determining whether the difference between the current compression ratio of the compressed data stored in the RAID array and a previous compression ratio is in a predetermined range. In some approaches, the current compression ratio is compared to a most recently determined compression ratio. For example, the compression ratio of the data stored in the RAID array is determined (e.g., sampled) on a reoccurring basis in some approaches. Thus, the current compression ratio is compared to the previously sampled data compression ratio. In other approaches, the current compression ratio is compared to the compression ratio initially predicted in operation 502.

According to an illustrative approach, which is in no way intended to limit the invention, the predetermined range is at least a 10%, more preferably at least a 20% difference between current compression ratio of the compressed data stored in the RAID array and a previous compression ratio. Moreover, an amount of time which separates the instance that the current compression ratio was determined and the instance that the previous compression ratio was determined factors into the determination made in decision 514 in some approaches. This amount of temporal separation may even affect the predetermined range. For example, a shorter amount of temporal separation may cause an increase in sensitivity by reduce the threshold percentage (e.g., at least a 10% difference), while a greater amount of temporal separation may cause a decrease in sensitivity by increasing the threshold percentage (e.g., at least a 20% difference).

However, the predetermined range may be set by a user, based on the physical storage capacity of the RAID array, based on industry standards, etc. It should also be noted that "in a range" is in no way intended to limit the invention. Rather than determining whether a value is in a given range, equivalent determinations may be made, e.g., as to whether a value is above a threshold, whether a value is outside a predetermined range, whether an absolute value is above a threshold, whether a value is below a threshold, etc., depending on the desired approach.

Referring still to FIG. 5A, the flowchart returns to operation 510 in response to determining that the compressibility of the data stored in the RAID array has not changed by a predetermined amount. In other words, method 500 continues to monitor performance of the RAID array and the compressed data being stored therein in response to determining that there are currently no performance issues. Although decisions 512 and 514 involve examining a periodic update and the compression ratio of the data stored in the RAID array respectively, additional performance characteristics, settings, status information, etc. may be evaluated in determining whether the virtual storage capacity of the RAID array is to be updated, e.g., as would be appreciated by one skilled in the art after reading the present description.

However, returning to decision 514, the flowchart does proceed to operation 516 in response to determining that the compressibility of the data stored in the RAID array has changed by a predetermined amount. As mentioned above, operation 516 includes using the current compression ratio of the compressed data stored in the RAID array and the physical storage capacity of the RAID array to calculate a current virtual storage capacity of the RAID array. Moreover, the current virtual storage capacity of the RAID array is preferably calculated by multiplying the current compression ratio of the compressed data stored in the RAID array with the physical storage capacity of the RAID array, e.g., according to any of the approaches described above.

Operation 518 further includes scaling the effective storage capacity of the RAID array based on the current virtual storage capacity. In other words, the effective storage capacity of the RAID array is updated such that it accurately reflects the current virtual storage capacity. As mentioned above, situations in which the maximum virtual storage capacity of a RAID array falls, for example, from 800 GB to 600 GB cause a similar effect on the effective storage capacity of the RAID array. Failing to account for this significant reduction to the effective storage capacity would likely lead to an undesirable data overflow event experienced by the RAID array. Accordingly, operation 518 desirably ensures that an accurate representation of both used and unused portions of the RAID array is maintained.

From operation 518, method 500 returns to operation 510. Again, this allows for method 500 to continue monitoring performance of the RAID array and the compressed data being stored therein. It also follows that one or more of the processes included in the flowchart in FIG. 5A may be repeated in an iterative fashion in order to maintain performance of the RAID array during continued use. Although not illustrated in FIG. 5A, method 500 may end in response to the storage devices on which the RAID array is located being powered off, receiving a termination command, a predetermined number of performance cycles being completed, a predetermined amount of time passing, etc.

Although method 500 is able to successfully implement and maintain operation of a RAID array, situations may arise in which the amount of compressed data stored in the RAID array becomes undesirably high, particularly with respect to the effective storage capacity of the RAID array. For example, the accumulative amount of data received at the RAID array over time may approach the physical storage capacity limitations of the storage devices on which the RAID array is located. In order to avoid data overflow situations from occurring as a result of such situations, a running capacity management procedure is preferably performed in the background of ongoing RAID array operations. For instance, looking now to FIG. 5B, a flowchart of a method 550 for implementing a running capacity management procedure for a RAID array, is shown according to one approach. The method 550 may be performed in accordance with the present invention in any of the environments depicted in FIGS. 1-5A, among others, in various approaches. For example, method 550 may be performed in the background of the RAID array operations in method 500 of FIG. 5A. Of course, more or less operations than those specifically described in FIG. 5B may be included in method 550, as would be understood by one of skill in the art upon reading the present descriptions.

Each of the steps of the method 550 may be performed by any suitable component of the operating environment. For example, in various approaches, the method 550 may be partially or entirely performed by a controller, a processor, a computer, etc., or some other device having one or more processors therein. Thus, in some approaches, method 550 may be a computer-implemented method. Moreover, the terms computer, processor and controller may be used interchangeably with regards to any of the approaches herein, such components being considered equivalents in the many various permutations of the present invention.

Moreover, for those approaches having a processor, the processor, e.g., processing circuit(s), chip(s), and/or module(s) implemented in hardware and/or software, and preferably having at least one hardware component may be utilized in any device to perform one or more steps of the method 550. Illustrative processors include, but are not limited to, a central processing unit (CPU), an application specific integrated circuit (ASIC), a field programmable gate array (FPGA), etc., combinations thereof, or any other suitable computing device known in the art.

Figure 5B:
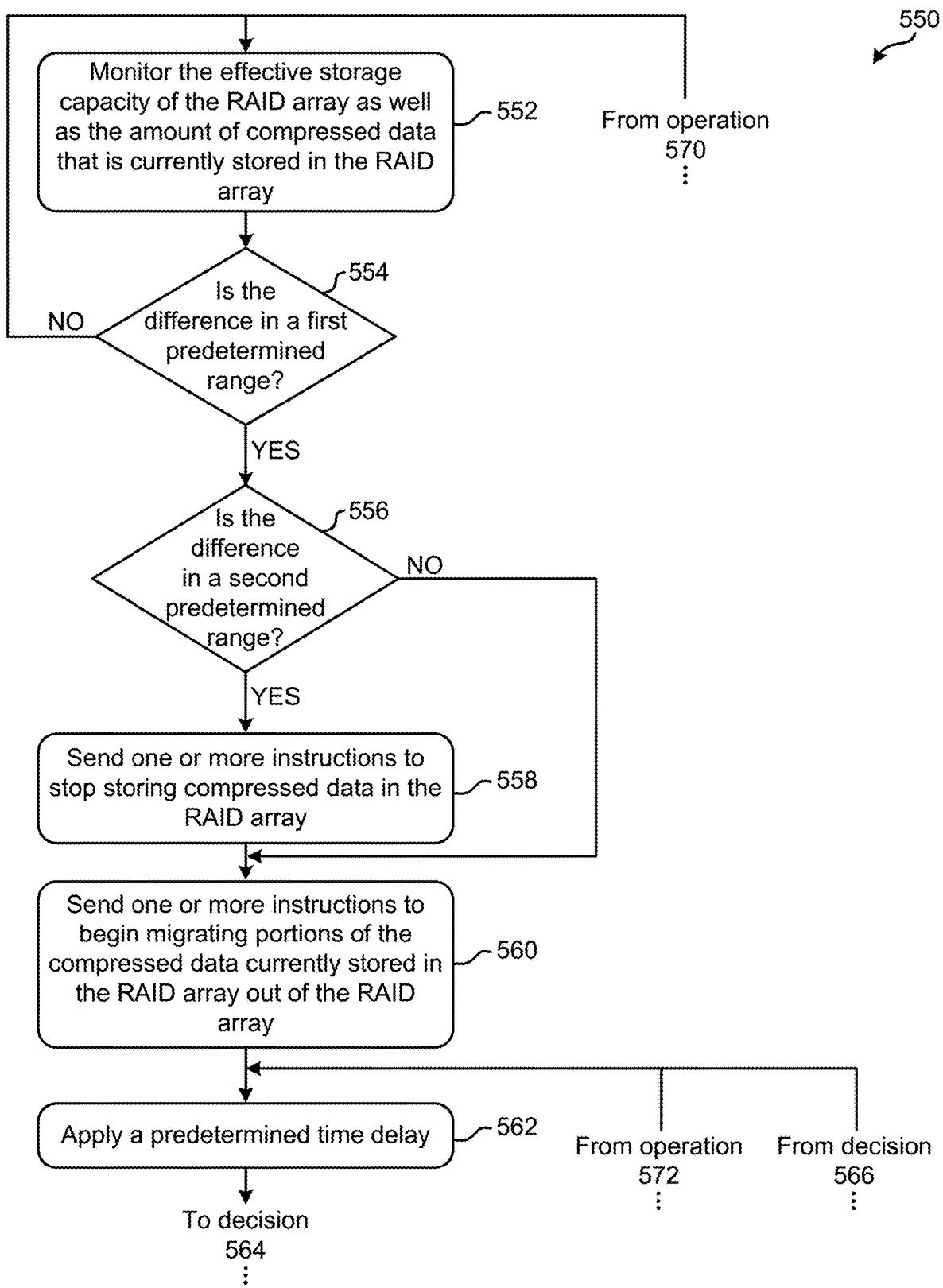
FIG. 5B is a flowchart of a background method in accordance with one approach.
Figure 5B:
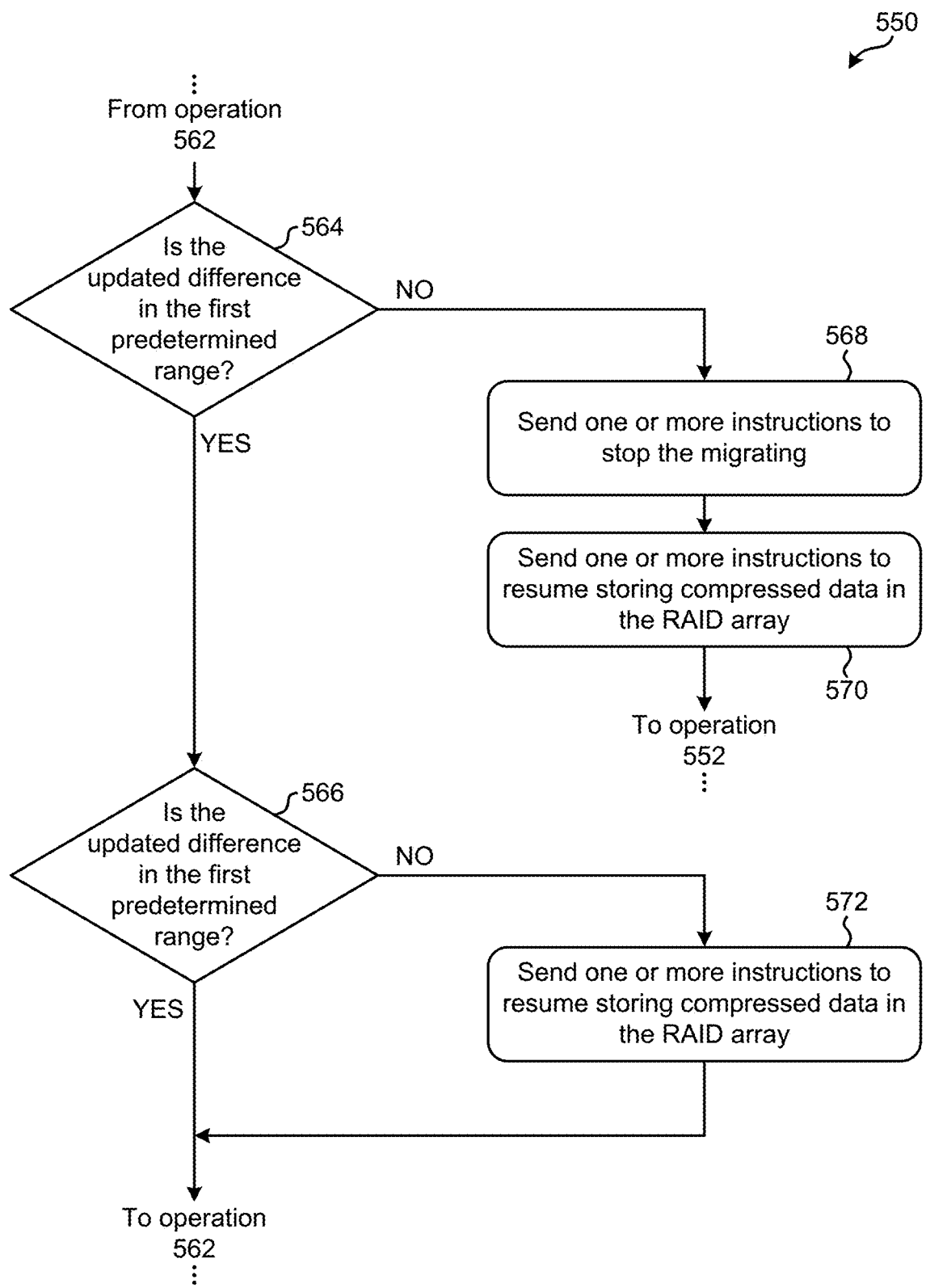

As shown in FIG. 5B, operation 552 of method 550 includes monitoring the effective storage capacity of the RAID array as well as the amount of compressed data that is currently stored in the RAID array. The effective storage capacity of the RAID array is monitored in some approaches by querying the effective storage capacity established in operation 506 of method 500.

Again, method 550 is preferably performed in the background and therefore may obtain desired information from ongoing processes. In other approaches, the effective storage capacity of the RAID array is monitored by examining one or more active (e.g., running) applications and the logical allocations corresponding thereto. In still other approaches, the effective storage capacity of the RAID array is monitored by querying a storage controller which manages the RAID array. In some approaches, operation 552 also involves determining whether overprovisioning has been applied to the effective storage capacity of the RAID array.

Similarly, the amount of compressed data that is currently stored in the RAID array is monitored in some approaches by inspecting the physical storage devices. In other approaches, the amount of compressed data that is currently stored in the RAID array is monitored by querying a storage controller which manages the RAID array, accessing an I/O module, inspecting network traffic received by the physical storage devices, etc., e.g., as would be appreciated by one skilled in the art after reading the present description.

Referring still to FIG. 5B, decision 554 includes determining whether a difference between the effective storage capacity of the RAID array and an amount of compressed data currently stored in the RAID array is in a first predetermined range. According to an illustrative approach, which is in no way intended to limit the invention, the first predetermined range is from about 20% to about 10% of the effective storage capacity of the RAID array. In other words, a difference between the effective storage capacity of the RAID array and an amount of compressed data currently stored in the RAID array which equates to being from about 20% to about 10% of the effective storage capacity of the RAID array is in the first predetermined range. It follows that decision 554 includes determining whether the RAID array is at risk of experiencing a data overflow event.

The first predetermined range may be set by a user, based on the physical storage capacity of the RAID array, based on industry standards, etc. It should also be noted that "in a first predetermined range" is in no way intended to limit the invention. Rather than determining whether a value is in a given range, equivalent determinations may be made, e.g., as to whether a value is above a threshold, whether a value is outside a predetermined range, whether an absolute value is above a threshold, whether a value is below a threshold, etc., depending on the desired approach. The first predetermined range may also be represented differently depending on the desired approach, e.g., such as a ratio, a unitless fraction, a measurable amount of storage capacity such as a specific number of GBs, etc.

In response to determining that the difference between the effective storage capacity of the RAID array and an amount of compressed data currently stored in the RAID array is not in a first predetermined range, method 550 returns to operation 552 such that the effective storage capacity of the RAID array and/or the amount of compressed data currently stored in the RAID array continue to be monitored. However, in response to determining that that the difference between the effective storage capacity of the RAID array and an amount of compressed data currently stored in the RAID array is in a first predetermined range, method 550 proceeds to decision 556. There, decision 556 includes determining whether the difference between the effective storage capacity of the RAID array and an amount of compressed data currently stored in the RAID array is in a second predetermined range.

The second predetermined range preferably represents a situation in which the effective storage capacity of the RAID array is even more strained than a situation corresponding to the first predetermined range. For example, the second predetermined range is between about 10% and about 0% of the effective storage capacity of the RAID array in some approaches, which are in no way intended to limit the invention. In other words, a difference between the effective storage capacity of the RAID array and an amount of compressed data currently stored in the RAID array which equates to being between about 10% and about 0%, more preferably between about 5% and about 0% of the effective storage capacity of the RAID array is in the second predetermined range. It follows that decision 556 includes determining whether the RAID array is at an even more extreme risk of experiencing a data overflow event, e.g., as would be appreciated by one skilled in the art after reading the present description.

In response to determining that the difference between the effective storage capacity of the RAID array and an amount of compressed data currently stored in the RAID array is in the second predetermined range, method 550 proceeds to operation 558 from decision 556. There, operation 558 includes sending one or more instructions to at least temporarily stop storing compressed data in the RAID array. According to some approaches, the one or more instructions are sent to a central storage controller which is able to divert incoming data to a designated storage queue which is capable of retaining the incoming data for an extended period of time. In other approaches, the one or more instructions are sent to an I/O module which stores the incoming data in one or more alternate portions of memory, e.g., at least until the RAID array has a sufficient amount of available storage capacity to maintain the incoming data that has been accumulated. However, incoming data received while the RAID array is effectively taken offline may be processed in any number of different ways, e.g., depending on the desired approach.

Operation 560 further includes sending one or more instructions to begin migrating portions of the compressed data currently stored in the RAID array out of the RAID array. In other words, operation 560 includes transferring compressed data from the RAID array to one or more other storage locations. By migrating compressed data out of the RAID array, operation 560 is able to incrementally reduce the amount of compressed data currently stored in the RAID array, thereby desirably increasing the difference between the effective storage capacity of the RAID array and the amount of compressed data currently stored in the RAID array. In other words, migrating compressed data out of the RAID array desirably increases the available storage capacity thereof.

Depending on the approach, compressed data may be migrated from the RAID array to any number of different storage locations. For example, in some approaches portions of compressed data are migrated from the RAID array to one or more other RAID arrays with available storage capacity. In other approaches, the compressed data is migrated to a queue which is capable of storing the compressed data therein, e.g., at least temporarily. In still other approaches, the compressed data may be migrated to memory components in different storage systems which may not be RAID configured. Moreover, the specific data which is migrated out of the RAID array may be selected at random, by a user, according to a predetermined algorithm, using a predetermined order, etc.

Referring back to decision 556 momentarily, it should be noted that method 550 proceeds directly to operation 560 from decision 556 in response to determining that the difference between the effective storage capacity of the RAID array and an amount of compressed data currently stored in the RAID array is not in the second predetermined range. It follows that operation 558 may only be performed in situations where the effective storage capacity of the RAID array is more significantly strained than situations involving the first predetermined range. However, the first and second predetermined ranges are in no way intended to be limiting. For example, in some instance, a single predetermined range may be used to decide whether data migration and/or a storage halt should be implemented.

Operation 562 further includes applying a predetermined time delay. A time delay is preferably applied such that the data migration operation is able to have a sufficient impact the amount of compressed data stored in the RAID array. Depending on the approach, the time delay may be predetermined by a user, based on industry standards, based on the difference between the effective storage capacity of the RAID array and the amount of compressed data currently stored in the RAID array, based on a data migration rate, etc.

From operation 562, method 550 proceeds to decision 564, which includes determining whether a difference between the effective storage capacity of the RAID array and an updated amount of compressed data currently stored in the RAID array is in the first predetermined range after an amount of time has passed. As mentioned above, the amount of time over which the data migration is performed has a direct effect on how much compressed data is actually removed from the RAID array, along with other factors such as the data migration rate. It follows that the determination made in decision 564 is performed with respect to an updated amount of compressed data currently stored in the RAID array. Moreover, any one or more of the approaches described above with respect to performing decision 554 may be applied to decision 564, e.g., as would be appreciated by one skilled in the art after reading the present description.

In response to determining that the difference between the effective storage capacity of the RAID array and the updated amount of compressed data currently stored in the RAID array is still in the first predetermined range, method 550 proceeds to decision 566. There, decision 566 includes determining whether the difference between the effective storage capacity of the RAID array and the updated amount of compressed data currently stored in the RAID array is in the second predetermined range. Again, the determination made in decision 566 is performed with respect to an updated amount of compressed data currently stored in the RAID array. Moreover, any one or more of the approaches described above with respect to performing decision 556 may be applied to decision 566, e.g., as would be appreciated by one skilled in the art after reading the present description.

In response to determining that the difference between the effective storage capacity of the RAID array and the updated amount of compressed data currently stored in the RAID array is also still in the second predetermined range, method 550 returns to operation 562. As a result, another predetermined time delay is applied before repeating decisions 564 and 566.

Returning to decision 564, method 550 advances to operation 568 in response to determining that that the difference between the effective storage capacity of the RAID array and the updated amount of compressed data currently stored in the RAID array is not in the first predetermined range. There, operation 568 includes sending one or more instructions to stop the migrating. In other words, operation 568 includes sending one or more instructions which cause the migration of data initiated in operation 560 to halt. Moreover, operation 570 includes sending one or more instructions to resume storing compressed data in the RAID array. In other words, the RAID array is able to return to nominal operating conditions in response to determining that the amount of compressed data currently stored in the RAID array is low enough that experiencing a data overflow event is not sufficiently likely. Accordingly, method 550 returns to operation 552 from operation 570 such that continued monitoring is performed.

Returning now to decision 566, method 550 proceeds to operation 572 in response to determining that the difference between the effective storage capacity of the RAID array and the updated amount of compressed data currently stored in the RAID array is not in the second predetermined range. There, operation 572 includes sending one or more instructions to resume storing compressed data in the RAID array. Although operation 572 includes storing compressed data in the RAID array again, the difference between the effective storage capacity of the RAID array and the updated amount of compressed data currently stored in the RAID array has already been determined as still being in the first predetermined range. Accordingly, compressed data continues to be migrated out of the RAID array despite new compressed data being stored therein, e.g., as would be appreciated by one skilled in the art after reading the present description. Similarly, one or more instructions are sent to stop storing compressed data in the RAID array in response to determining that the difference between the effective storage capacity of the RAID array and an updated amount of compressed data currently stored in the RAID array has returned to being in the first and/or second predetermined ranges, respectively.

Operation 572 may be performed using processes which are the same, similar to, or different than those used to perform operation 570 depending on the desired approach. From operation 572, the flowchart returns to operation 562 as well as decisions 564 and 566. It follows that processes 562, 564, 566, 568, 570 and/or 572 may be repeated any number of times until the difference between the effective storage capacity of the RAID array and the amount of compressed data currently stored in the RAID array is not in the first predetermined range, and not in the second predetermined range.

It follows that various ones of the approaches included herein are able to actively monitor data compression ratios at the individual storage device level and adjust a virtual capacity of the overarching logical array (e.g., RAID array) based on the device level compression performance. This desirably allows for various ones of the approaches included herein to effectively and efficiently implement RAID arrays which support data compression.

Furthermore, these achievements also allow for storage systems to experience improved data redundancy and overall performance in comparison to traditional data storage schemes. For instance, these improvements are advantageously achieved without experiencing performance delays and/or data losses caused by storage capacity issues, e.g., as has been experienced by conventional implementations. As previously mentioned, while RAID arrays provide a number of improvements to data storage, they have previously been unable to effectively support compressed data.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method for implementing a redundant array of independent disks (RAID) array, comprising:
   predicting a compression ratio of data to be stored in the RAID array;
   using the predicted compression ratio and a physical storage capacity of the RAID array to calculate a maximum virtual storage capacity of the RAID array;
   establishing an effective storage capacity of the RAID array using the maximum virtual storage capacity;
   sending one or more instructions to store compressed data in the RAID array;
   in response to occurrence of a predetermined event, using a current compression ratio of the compressed data stored in the RAID array and the physical storage capacity of the RAID array to calculate a current virtual storage capacity of the RAID array; and
   scaling the effective storage capacity of the RAID array based on the current virtual storage capacity.

2. The computer-implemented method of claim 1, wherein the occurrence of the predetermined event is passage of a predetermined amount of time.

3. The computer-implemented method of claim 1, wherein the occurrence of the predetermined event is detection of a predetermined change in the current compression ratio of the compressed data stored in the RAID array.

4. The computer-implemented method of claim 1, comprising:
   overprovisioning a percentage of the physical storage capacity of the RAID array.

5. The computer-implemented method of claim 1, wherein the RAID array spans across more than one hard disk drive.

6. The computer-implemented method of claim 1, comprising:
   determining whether a difference between the effective storage capacity of the RAID array and an amount of compressed data currently stored in the RAID array is in a first predetermined range; and
   in response to determining that the difference between the effective storage capacity of the RAID array and the amount of compressed data currently stored in the RAID array is in the first predetermined range, sending one or more instructions to begin migrating portions of the compressed data currently stored in the RAID array out of the RAID array.

7. The computer-implemented method of claim 6, comprising:
   determining whether a difference between the effective storage capacity of the RAID array and an updated amount of compressed data currently stored in the RAID array is in the first predetermined range; and
   in response to determining that the difference between the effective storage capacity of the RAID array and the updated amount of compressed data currently stored in the RAID array is not in the first predetermined range, sending one or more instructions to stop the migrating.

8. The computer-implemented method of claim 6, comprising:
   determining whether the difference between the effective storage capacity of the RAID array and the amount of compressed data currently stored in the RAID array is in a second predetermined range; and
   in response to determining that the difference between the effective storage capacity of the RAID array and the amount of compressed data currently stored in the RAID array is in the second predetermined range, sending one or more instructions to stop storing compressed data in the RAID array.

9. The computer-implemented method of claim 8, comprising:
   determining whether a difference between the effective storage capacity of the RAID array and an updated amount of compressed data currently stored in the RAID array is in the second predetermined range; and
   in response to determining that the difference between the effective storage capacity of the RAID array and the updated amount of compressed data currently stored in the RAID array is not in the second predetermined range, sending one or more instructions to resume storing compressed data in the RAID array.

10. The computer-implemented method of claim 9, comprising:
    determining whether the difference between the effective storage capacity of the RAID array and the updated amount of compressed data currently stored in the RAID array is in the first predetermined range; and
    in response to determining that the difference between the effective storage capacity of the RAID array and the updated amount of compressed data currently stored in the RAID array is not in the first predetermined range, sending one or more instructions to stop the migrating.

11. A computer program product for implementing a redundant array of independent disks (RAID) array, the computer program product comprising a computer readable storage medium having program instructions embodied therewith, the program instructions readable and/or executable by a processor to cause the processor to:
    predict, by the processor, a compression ratio of data to be stored in the RAID array;

use, by the processor, the predicted compression ratio and a physical storage capacity of the RAID array to calculate a maximum virtual storage capacity of the RAID array;

establish, by the processor, an effective storage capacity of the RAID array using the maximum virtual storage capacity;

send, by the processor, one or more instructions to store compressed data in the RAID array;

in response to occurrence of a predetermined event, use, by the processor, a current compression ratio of the compressed data stored in the RAID array and the physical storage capacity of the RAID array to calculate a current virtual storage capacity of the RAID array; and scale, by the processor, the effective storage capacity of the RAID array based on the current virtual storage capacity.

12. The computer program product of claim 11, wherein the occurrence of the predetermined event is passage of a predetermined amount of time.

13. The computer program product of claim 11, wherein the occurrence of the predetermined event is detection of a predetermined change in the current compression ratio of the compressed data stored in the RAID array.

14. The computer program product of claim 11, the program instructions readable and/or executable by the processor to cause the processor to:

overprovision, by the processor, a percentage of the physical storage capacity of the RAID array.

15. The computer program product of claim 11, wherein the RAID array spans across more than one hard disk drive.

16. The computer program product of claim 11, the program instructions readable and/or executable by the processor to cause the processor to:

determine, by the processor, whether a difference between the effective storage capacity of the RAID array and an amount of compressed data currently stored in the RAID array is in a first predetermined range; and in response to determining that the difference between the effective storage capacity of the RAID array and the amount of compressed data currently stored in the RAID array is in the first predetermined range, send, by the processor, one or more instructions to begin migrating portions of the compressed data currently stored in the RAID array out of the RAID array.

17. The computer program product of claim 16, the program instructions readable and/or executable by the processor to cause the processor to:

determine, by the processor, whether a difference between the effective storage capacity of the RAID array and an updated amount of compressed data currently stored in the RAID array is in the first predetermined range; and in response to determining that the difference between the effective storage capacity of the RAID array and the updated amount of compressed data currently stored in the RAID array is not in the first predetermined range, send, by the processor, one or more instructions to stop the migrating.

18. The computer program product of claim 16, the program instructions readable and/or executable by the processor to cause the processor to:

determine, by the processor, whether the difference between the effective storage capacity of the RAID array and the amount of compressed data currently stored in the RAID array is in a second predetermined range; and in response to determining that the difference between the effective storage capacity of the RAID array and the amount of compressed data currently stored in the RAID array is in the second predetermined range, send, by the processor, one or more instructions to stop storing compressed data in the RAID array.

19. The computer program product of claim 18, the program instructions readable and/or executable by the processor to cause the processor to:

determine, by the processor, whether a difference between the effective storage capacity of the RAID array and an updated amount of compressed data currently stored in the RAID array is in the second predetermined range; and in response to determining that the difference between the effective storage capacity of the RAID array and the updated amount of compressed data currently stored in the RAID array is not in the second predetermined range, send, by the processor, one or more instructions to resume storing compressed data in the RAID array.

20. The computer program product of claim 19, the program instructions readable and/or executable by the processor to cause the processor to:

determine, by the processor, whether the difference between the effective storage capacity of the RAID array and the updated amount of compressed data currently stored in the RAID array is in the first predetermined range; and in response to determining that the difference between the effective storage capacity of the RAID array and the updated amount of compressed data currently stored in the RAID array is not in the first predetermined range, send, by the processor, one or more instructions to stop the migrating.

21. A system, comprising:

a processor; and logic integrated with the processor, executable by the processor, or integrated with and executable by the processor, the logic being configured to:

predict, by the processor, a compression ratio of data to be stored in a redundant array of independent disks (RAID) array;

use, by the processor, the predicted compression ratio and a physical storage capacity of the RAID array to calculate a maximum virtual storage capacity of the RAID array;

overprovision, by the processor, a percentage of the physical storage capacity of the RAID array;

establish, by the processor, an effective storage capacity of the RAID array using the maximum virtual storage capacity;

send, by the processor, one or more instructions to store compressed data in the RAID array;

in response to occurrence of a predetermined event, use, by the processor, a current compression ratio of the compressed data stored in the RAID array and the physical storage capacity of the RAID array to calculate a current virtual storage capacity of the RAID array; and scale, by the processor, the effective storage capacity of the RAID array based on the current virtual storage capacity.

22. The system of claim 21, wherein the occurrence of the predetermined event is passage of a predetermined amount of time and/or detection of a predetermined change in the current compression ratio of the compressed data stored in the RAID array.

23. The system of claim 21, the logic being configured to:
determine, by the processor, whether a difference between the effective storage capacity of the RAID array and an amount of compressed data currently stored in the RAID array is in a first predetermined range; and
in response to determining that the difference between the effective storage capacity of the RAID array and the amount of compressed data currently stored in the RAID array is in the first predetermined range, send, by the processor, one or more instructions to begin migrating portions of the compressed data currently stored in the RAID array out of the RAID array.

24. The system of claim 23, the logic being configured to:
determine, by the processor, whether a difference between the effective storage capacity of the RAID array and an updated amount of compressed data currently stored in the RAID array is in the first predetermined range; and
in response to determining that the difference between the effective storage capacity of the RAID array and the updated amount of compressed data currently stored in the RAID array is not in the first predetermined range, send, by the processor, one or more instructions to stop the migrating.

25. The system of claim 23, the logic being configured to:
determine, by the processor, whether the difference between the effective storage capacity of the RAID array and the amount of compressed data currently stored in the RAID array is in a second predetermined range;
in response to determining that the difference between the effective storage capacity of the RAID array and the amount of compressed data currently stored in the RAID array is in the second predetermined range, send, by the processor, one or more instructions to stop storing compressed data in the RAID array;
determine, by the processor, whether a difference between the effective storage capacity of the RAID array and an updated amount of compressed data currently stored in the RAID array is in the second predetermined range;
in response to determining that the difference between the effective storage capacity of the RAID array and the updated amount of compressed data currently stored in the RAID array is not in the second predetermined range, send, by the processor, one or more instructions to resume storing compressed data in the RAID array;
determine, by the processor, whether the difference between the effective storage capacity of the RAID array and the updated amount of compressed data currently stored in the RAID array is in the first predetermined range; and
in response to determining that the difference between the effective storage capacity of the RAID array and the updated amount of compressed data currently stored in the RAID array is not in the first predetermined range, send, by the processor, one or more instructions to stop the migrating.

* * * * *